Figure 1:
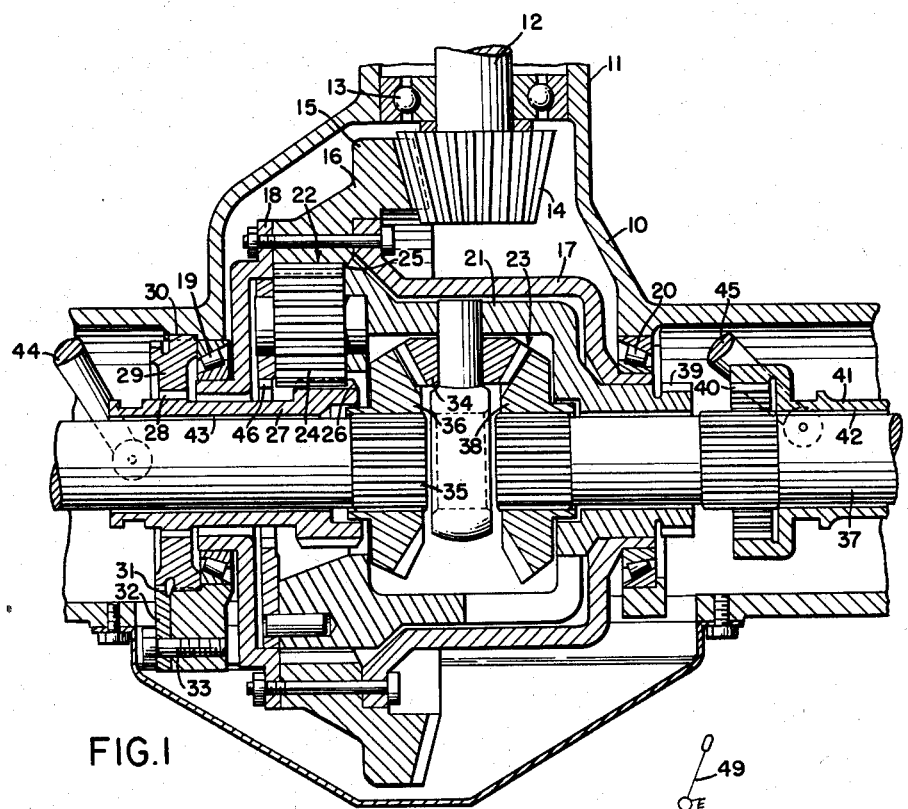

Aug. 2, 1960

E. STUMP 2,947,200

AXLE GEAR FOR MOTOR VEHICLES

Filed Dec. 17, 1956

INVENTOR.
EUGEN STUMP
BY
*Dicke and Craig*

ATTORNEYS 2,947,200
Patented Aug. 2, 1960

United States Patent Office

2,947,200
AXLE GEAR FOR MOTOR VEHICLES

Eugen Stump, Stuttgart-Unterturkheim, Germany, assignor to Daimler-Benz Aktiengesellschaft, Stuttgart-Unterturkheim, Germany Filed Dec. 17, 1956, Ser. No. 628,639

Claims priority, application Germany Dec. 16, 1955

4 Claims. (Cl. 74—695)

The present invention relates to an axle gear for motor vehicles with a differential gear and with a two-speed change speed gear, especially with an additional gear transmission which is combined into a single unit with the differential gear and which consists to a considerable extent in that a clutch for the change-speed gear as well as a locking arrangement for the change-speed gear are accommodated within the axle gear housing.

A transmission aggregate of this type which is provided with an additional change-speed gear transmission and with a differential gear adapted to be locked in one or both speeds of the additional change-speed transmission is particularly suitable for large and heavy vehicles, such as trucks or buses so that even under difficult driving conditions, especially with icy roads, a safe driving is assured.

Moreover, the accommodation of the shifting clutch and locking mechanism within the axle gear housing provides a closed, space-saving arrangement which is protected against damages.

A particularly simple arrangement which is especially suitable for the construction of the transmission, above all as regards the spatial arrangement of the change-speed gear and the locking mechanism of the differential is further achieved in that the change-speed gear or the shifting arrangement for the shifting clutch of the change-speed gear is located to one side of the differential gear and the shifting arrangement for the locking mechanism on the other side of the change-speed gear. The shifting arrangement for the change-speed gear and the locking mechanism may thereby be accommodated for all practical purposes within the usually available space which is required for the axle gear housing. Simultaneously therewith a relatively even distribution of the masses or weight on both sides of the longitudinal center plane of the axle gear is rendered possible by such a construction.

Preferably the change-speed gear iss constructed as planetary gear, especially as a spur-planetary gear, the planet carrier of which simultaneously forms the planet carrier of the bevel gear planet wheels of a bevel wheel differential gear. Such a transmission may be installed in a particularly favorable manner as regards spatial requirements and operating conditions into the axle gear, preferably in such a manner that it is accommodated in the spur bevel gear driven from the engine in the usual manner by an axle drive bevel wheel and in its turn driving the differential gear. The planet gears of the planetary gear transmission may thereby rotatably support themselves against or mesh with a sun gear adapted to be braked against the stationary housing whereas the outer ring gear of the transmission is formed by a gear ring arranged, for example, on the inside of the spur bevel gear.

In order to engage the two speeds of the planetary gear, either the sun gear is adapted to be appropriately braked, for purposes of achieving a step-down gearing ratio, or the sun gear may be coupled through a clutch with the planet carrier, for purposes of achieving a direct speed.

According to a further feature in accordance with the present invention, the shifting operation of the planetary gear may take place in a particularly simple manner by displacement of the sun gear in such a manner that the gear rim of the sun gear which meshes with the planet wheels may simultaneously be brought into engagement with a gear rim of the planet carrier.

A shifting sleeve which is preferably formed simultaneously as sun gear serves for purposes of shifting the change-speed gear, whereby the shifting sleeve in one position thereof is in engagement, on the one hand, with the planet wheels of the planetary gear serving as differential and, on the other hand, with the rigidly arranged claws or teeth of a gear rim, for example, secured to the housing, and in the other position locks the planetary gear in itself.

Preferably, for the shifting of the change-speed transmission and for the engagement and disengagement of the locking mechanism for the differential gear, two shifting sleeves are provided which either are arranged on one each of the two axially disposed axle shafts, which are connected with each other by the differential gear, or surround the axle shafts.

The shifting arrangement for shifting the change-speed gear and the shifting arrangement for locking the differential gear may be shifted in dependence of one another, for example, in such a manner that the locking of the differential gear only takes place in one of the two speeds or may also take place independently of one another. The latter arrangement has the advantage that in each of the two speeds of the change-speed gear, the differential gear may be selectively unlocked or locked.

Accordingly, it is an object of the present invention to provide an axle gear arrangemnt for motor vehicles, particularly for large vehicles such as trucks or buses, which includes a lockable differential gear as well as a two-speed change speed gear.

Another object of the present invention is the provision of a space-saving, compact and sturdy construction of an axle gear which is provided with a differential and a change-speed gear, both accommodated within the housing of the axle gear in such a manner that the housing essentially does not exceed the usual spatial requirements of ordinary axle gears.

A still further object of the present invention is to provide an axle gear which assures safe operation of large vehicles even under adverse driving conditions, such as icy roads.

A still further object of the present invention resides in the simplicity and space-saving arrangement of a two-speed transmission and differential both combined into a single unit in the axle gear.

Another object of the present invention is the provision of an axle gear provided with a two-speed transmission and with a differential both of which are protected against dirt and damages by being completely enclosed.

A still further object of the present invention is the provision of an axle gear which has a favorable, balanced weight distribution of the parts constituting a differential and two-speed transmission both incorporated therein.

Another object of the present invention is the provision of a simple shifting arrangement for both the change-speed transmission and the differential gear accommodated in the axle gear, particularly by providing shifting sleeves which are adapted to be shifted in the axial direction thereof to shift the change-speed transmission from one into the other speed and for locking or releasing the differential gear.

A still further object of the present invention lies in a particularly simple shifting arrangement for both the change-speed transmission and the axle gear differential which are combined into a single constructional unit and which permits great versatility in the operation thereof.

These and other objects, features and advantages of the present invention will become more obvious from the following description when taken in connection with the accompanying drawing which shows, for purposes of illustration only, one preferred embodiment of the internal details of the change-speed transmission and the lockable differential gear as well as a preferred embodiment of an actuating linkage interconnecting and coordinating the shift of the transmission and the locking of the differential in accordance with the present invention.

Figure 2:
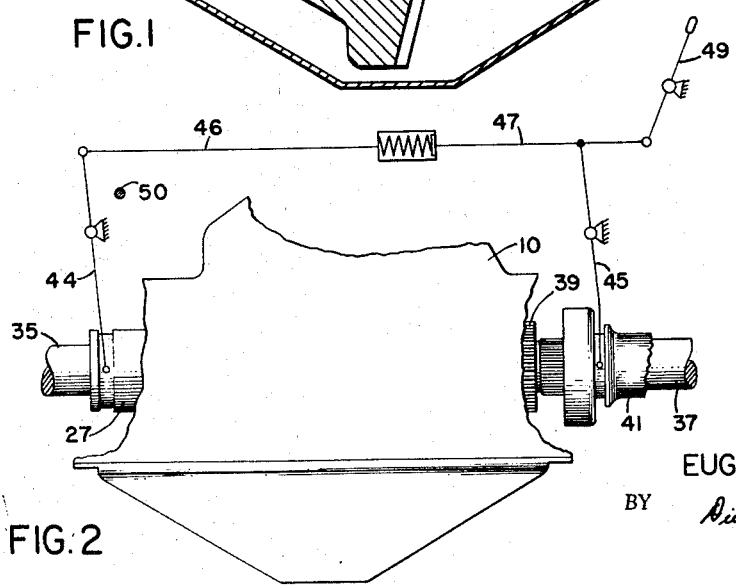

Figure 1 is a horizontal cross-section of the axle gear generally in the plane of the axis of the wheel axles with some of the parts of the gear mechanism shown in full for the sake of clarity; and Figure 2 is a schematic illustration of an actuating linkage interconnecting adjustable sleeves for the change-speed transmission and the lockable differential, respectively, the axle gear housing being shown merely in outline.

Referring now more particularly to the drawing which in Figure 1 thereof shows one embodiment of an axle gear transmission in accordance with the present invention in a horizontal cross section through the axle gear, reference numeral 10 designating a housing of a rear axle, for example, of a rigid rear axle. The rear axle is articulately connected at the vehicle frame by means of a forwardly extending torque tube 11 in a manner not illustrated herein and is springily supported against the frame by means of springs of any suitable construction, such as leaf springs, helical coil springs or the like (not shown). The drive shaft 12 is journalled in the housing 10, i.e., in the torque tube 11 by means of suitable ball or roller bearings of which only one bearing 13 is indicated. The drive shaft 12 drives the spur bevel gear 15 over a bevel gear pinion 14. The spur bevel gear 15 which may be formed of two or three parts suitably interconnected, for example, parts 16, 17 and 18 constituting a housing, is journalled in the housing 10 by means of roller bearings 19 and 20.

The transmission member 21, preferably formed of two or more parts, which is also shaped as a housing, is journalled within the housing-shaped spur bevel gear 16, 17, 18. The transmission member 21 serves simultaneously as planet carrier for the two-speed change-speed transmission 22 as well as for the bevel wheel differential gear 23.

The additional change-speed gear is formed as pinion planetary gear and includes the planet wheels 24, for example, three planet wheels which are journalled in the planet carrier 21. The planet wheels 24 are in meshing engagement, on the one hand, with the internal gear rim 25 at the center part 16 of the housing shaped spur bevel gear 16, 17, 18 and, on the other, with the toothed rim 26 of a shifting sleeve 27 serving as sun gear. The shifting sleeve 27 carries teeth 28 which are in meshing engagement with correspondingly shaped internal teeth effective as claws of a claw member 29 which in turn is threadably inserted into the axle gear housing 10 by means of threads 30 and is provided with a toothed connection 31 which is in engagement with correspondingly-shaped teeth of the locking member 32 which is secured to the axle gear housing 10 by means of bolts 33.

Furthermore, bevel-wheel planet gears 34 of the differential gear 23 are journalled in the housing shaped planet carrier 21. The bevel-wheel planet gears 34 are in engagement, on the one hand, with the bevel gears 36 and 38 which are rigidly arranged on the transversely extending axle shafts 35 and 37, respectively.

The end of the planet carrier 21 disposed opposite to the additional change-speed gear is provided with a claw-like tooth connection 39 which, for purposes of locking the differential, may be brought into engagement with the correspondingly shaped claw-tooth connection 40 of a shifting sleeve 41 actuated by a shifting lever 45. The shifting sleeve 41 is connected with the shaft 37 in an axially displaceable manner but for common rotation therewith by means of splines and spline grooves 42 of suitable construction.

The opposite shifting sleeve 27, in contradistinction thereto, surrounds the axle shaft 35 with play as indicated at 43, and is actuated by a shifting lever 44. The planet carrier 21 is further provided with teeth 46 with which the teeth of the sun gear 26 may be brought to engagement upon displacement thereof, i.e., upon axial displacement of shifting sleeve 27.

In the illustrated position, the locking mechanism 39, 40 is disengaged. Consequently, the axle differential gear 23 is released or unlocked and operates in the normal manner. In the change-speed transmission 22 a low-speed reduction gear ratio or speed is engaged in that the shifting sleeve 27 which is effective as sun gear is held stationary by the claws 28 against the housing 10. The spur bevel gear 15, therefore drives the planet carrier 21 with a reduction to a lower speed by reason of the fact that the planet gears 24 run around the stationary sun gear 26.

If the shifting sleeve 27 is axially displaced toward the left, then the teeth of rim or sun gear 26 constituted by a portion of sleeve 27 come into engagement with the teeth 46 at the planet carrier 21, whereas the claws 28 of sleeve 27 are disengaged from fixed claw member 29 whereby the planet carrier 22 is locked in itself and thereby provides a drive from the spur bevel gear 15 to the planet carrier 21 at a ratio of one-to-one.

In each of the two speeds the locking mechanism 39, 40 of differential gear 23 may be either disengaged with the shifting sleeve 41 in the right position or engaged with the shifting sleeve 41 in the left position. However, the shifting sleeves 27 and 41 or the shifting levers 44 and 45 thereof, if so desired, may be connected with each other, for example, by appropriate linkages in such a manner that in one of the two speeds the differential is unlocked and in the other the differential is locked. However, as seen in Figure 2, the shifting arrangement may also be made in such a manner that at first in both speeds selected by an actuating lever the locking mechanism is disengaged and that the locking mechanism is brought into locking position thereof only after a further additional stroke of the actuating lever, for example, against the spring effect of a lost motion device connecting sleeves 27 and 41 while the previously, last-engaged speed remains engaged.

The lost motion device connecting the sleeves 27 and 41 may comprise a plurality of links 46 and 47 interconnecting the levers 44 and 45. These links 46 and 47 are connected by a lost motion spring device 48 and may be operated, for instance, by a hand lever 49. When the lever 49 is turned in a counter-clockwise direction, levers 44 and 45 will at first move together in clockwise direction until lever 44, or sleeve 27 moved by this lever, reaches a stop element indicated at 50. When the hand lever 49 is turned further, the lever 44 is held by the stop 50 while lever 45 will continue its movement, the spring of the lost motion device 48 being thus compressed and the further movement of lever 45 effecting the locking of the differential gearing. The shifting of the planetary speed change gearing accordingly takes place before lever 44 abuts stop 50, whereas the locking of the differential gearing occurs thereafter.

While I have shown and described only one preferred embodiment in accordance with the present invention, it is understood that the same is not limited thereto, but is susceptible of many changes and modifications in accordance with the present invention, and I intend to cover all such changes and modifications as defined by the appended claims.

I claim:
1. An axle drive arrangement for motor vehicles comprising an axle gear housing, input means, output means formed by two axle shafts, differential gear means within said housing including a planet carrier and at least one planetary gear thereon operatively connected with both said axle shafts, a sleeve axially slidable on one axle shaft for coupling said planet carrier to said one axle shaft and selectively movable on the latter to lock or unlock said differential gear means, change speed gear means interconnecting said input means and said planet carrier for rotatably driving the latter at various speeds, said change-speed gear means including at least one planetary gear rotatably mounted on said planet carrier, and a sleeve axially slidable on the other of said axle shafts for selectively locking or unlocking said last-mentioned planetary gear relative said carrier to select different ones of said speeds, said axle drive arrangement including means for actuating both said sleeves in unison.

2. An axle drive arrangement for motor vehicles comprising an axle gear housing, input means, output means formed by two axle shafts, differential gear means within said housing including a planet carrier and at least one planetary gear thereon operatively connected with both said axle shafts, a sleeve axially slidable on one axle shaft for coupling said planet carrier to said one axle shaft and selectively movable on the latter to lock or unlock said differential gear means, change speed gear means interconnecting said input means and said planet carrier for rotatably driving the latter at various speeds, said change speed gear means including at least one planetary gear rotatably mounted on said planet carrier, and a sleeve axially slidable on the other of said axle shafts for selectively locking or unlocking said last-mentioned planetary gear relative said carrier to select different ones of said speeds, said axle drive arrangement including selectively operable means for actuating said sleeves comprising link means with a lost-motion device connecting said sleeves to selectively engage any of said various speeds while said differential gear means remains in one of the locked or unlocked conditions whereas said condition is only changed upon further actuation of said actuating means while a predetermined engaged speed of said change speed gear means remains unchanged.

3. An axle drive arrangement, according to claim 2, wherein said change speed gear means includes a sun gear, and where said last-mentioned sleeve is movable to alternately connect the sun gear with the planet carrier or the axle gear housing.

4. An axle drive arrangement according to claim 2, wherein said last-mentioned sleeve associated with the panletary gear is loosely mounted on a respective axle shaft and is formed as an axially movable sun gear, whereas the other sleeve for locking the differential gear means is mounted on a respective axle shaft for common rotation therewith but for axial movement with respect thereto and is operative in response to said axial movement to clutch the respective axle shaft to said planet carrier.

References Cited in the file of this patent

UNITED STATES PATENTS

| | | |
|---|---|---|
| 1,262,430 | Avilov | Apr. 9, 1918 |
| 1,362,361 | Starr | Dec. 14, 1920 |
| 1,389,692 | Pennington & Wellmann | Sept. 6, 1921 |
| 1,759,665 | Servon | May 20, 1930 |
| 2,178,900 | Starr | Nov. 7, 1939 |
| 2,203,282 | Keese | June 4, 1940 |
| 2,306,545 | Kummich | Dec. 29, 1942 |
| 2,445,760 | Buckendale | July 27, 1948 |